April 12, 1960   W. L. EXNER ET AL   2,932,471
BROAD BANDWIDTH DIGITAL SERVO
Filed Sept. 30, 1954   4 Sheets-Sheet 1

INVENTOR.
WILLIAM L. EXNER,
ALFRED O. SCARBROUGH,
BY
Henry Heyman
ATTORNEY.

April 12, 1960  W. L. EXNER ET AL  2,932,471
BROAD BANDWIDTH DIGITAL SERVO
Filed Sept. 30, 1954  4 Sheets-Sheet 3

INVENTORS.
WILLIAM L. EXNER,
ALFRED D. SCARBROUGH,
BY
Henry Hayman
ATTORNEY.

United States Patent Office

2,932,471
Patented Apr. 12, 1960

2,932,471

BROAD BANDWIDTH DIGITAL SERVO

William L. Exner, Santa Monica, and Alfred D. Scarbrough, Pasadena, Calif., assignors to Hughes Aircraft Company, Culver City, Calif., a corporation of Delaware Application September 30, 1954, Serial No. 459,302

18 Claims. (Cl. 244—77)

The present invention relates to automatic digital control mechanisms, and more particularly to a digital servo apparatus for maintaining a predetermined relationship between conditions of a physical system by continually adjusting selected conditions of the system in accordance with the values of the other conditions, in order to satisfy the predetermined relationship.

In recent years, because of the rapid development and perfection of digital data processing equipment, great interest has been aroused in the application of such equipment to the direct control of physical processes and systems. The advantages of such application have been obvious since they would allow utilization of the peculiar advantages of modern digital computation, namely, the ability to carry on extensive and complicated calculations at very high computation speeds and to carry out a desired computation to almost any order of accuracy. As one example of a field of application for digital data-processing equipment, consider the problem of automatically controlling a chemical reaction taking place in a solution, in which reaction an optimum yield of a particular end-product compound may be obtained by maintaining a predetermined relationship between the temperature of the solution and the respective concentrations of the various ingredients that react together in the solution to form the end-product compound. One method of obtaining the desired optimum yield would be to rigidly maintain the temperature and the various ingredient concentrations at fixed levels that satisfied the predetermined relationship.

A second method of obtaining the desired yield would be to select one or more of the conditions of the system, and while allowing the other conditions of the system to vary independently over a fairly wide range of values, employ an automatic closed loop servo apparatus to adjust the values of the selected conditions to satisfy the overall predetermined relationship. The concentration of one ingredient, for example, might be a selected condition, and while the values of the other ingredient concentrations and of the temperature were allowed to fluctuate over fairly wide values as the reaction proceeded, the concentration of the selected ingredient would be adjusted from time to time by the servo loop in accordance with the temperature and the values of the other ingredient concentrations, so as to satisfy the predetermined relationship and thus obtain the desired optimum yield.

The above described second method of controlling a physical system by adjusting selected conditions of the system is in general, a method which, if it could be readily mechanized, would be preferred in industry and commerce because of the greater flexibility in operation allowed by the use of this method. For example, a chemical manufacturing plant which could use the second method could utilize raw materials of widely varying characteristics rather than requiring that raw materials meet rigid acceptance standards. The economic benefits of such flexibility of operation are obvious.

In the practice of the second method for the control of a physical system, an ability to solve complicated equations may be required of elements of the controlling servo-loop, for often the required predetermined relationship between the conditions of the physical system is represented by extremely complex mathematical equations, and in order to keep pace with changes in the physical system, very extensive calculations must be performed in a relatively short time. The recent development and perfection of high-speed digital calculating equipment therefore has naturally aroused great interest in the inclusion of such equipment in closed loop servo systems.

However, there are certain characteristics common to digital calculating equipment of the described type, which have severely limited the practical usefulness of such equipment in closed loop servo systems: digital computers now known to the art operate upon sampled data and require a finite computation period, after each sampling operation, to complete a problem solution. Thus the inclusion of a digital computer in a closed loop servo-control apparatus for the computation of a control signal inevitably results in some delay in the production of the control signal. As is well known in the art, the presence of delay in a closed servo loop tends to cause instability. The reason for such instability can be intuitively and qualitatively understood when it is realized that a digital computer, which is coupled in a closed servo-loop to a physical system for the production of a control signal, cannot respond to sudden changes in the controlled physical system that take place within a single computation period. A more quantitative analysis of the loop stability problem such as that supplied by J. M. Salzer in an article entitled, "Frequency Analysis of Digital Computers Operating in Real Time," in "Proc. I.R.E.," February 1954, discloses that in a simple closed loop servo system, for maintenance of adequate stability, a digital computer included in the simple servo loop must complete problem solutions at a rate which approaches five times the highest signal frequency which is likely to be required in the loop. It is clear, therefore, that for a servo loop which includes a digital computer and which may be referred to hereinafter as a partly digital servo loop, the stability of the servo loop is largely determined by the effective frequency response or bandwidth of the digital computer in relation to the rate at which significant changes occur in the controlled physical system.

In a wide class of applications wherein required computations are relatively complex and the controlled physical system is subject to rapid fluctuations and transient disturbances, a digital computer may not have sufficient bandwidth to meet the stringent requirements made on the computer for maintenance of loop stability, while having more than adequate bandwidth for carrying on its fundamental function of computing problem solutions at a rate consistent with controlling longer term variations in the physical system.

The described difficulty is often especially severe in the practice of the second method for the control of a physical system, for, as mentioned hereinbefore, the predetermined relationship between the conditions of the physical system will often be extremely complex and therefore, even at the high rates of computation allowed by modern digital data-processing equipment, computation of a problem solution may require computation periods which are too long for the maintenance of short term stability of the controlled physical system.

In the practice of the second method for the control of physical systems, additional bandwidth restrictions may be imposed upon the digital elements of the controlling servo loop by the necessity for filtering or smoothing of the output control signal produced by said digital elements. Such a necessity arises because the input data received by the digital computer may be quite rough, causing computer output to fluctuate violently, or, on the other hand, computer output may fluctuate violently because of occasional malfunctioning of the computer. When applied to control systems such fluctuations of output may be sufficiently abrupt to injure the controlled physical system and it is often necessary to filter the computer output to protect the physical system. Unfortunately, such filtering results in increased delay and further limitation of the frequency bandwidth of the data processing equipment.

As a result of these several disadvantages, modern digital computing equipment has been utilized in servo control of physical systems only when the problem to be solved by the computing equipment is relatively simple and where the speed of operation required of the servo system has been relatively low.

It is, therefore, an object of the invention to provide a digital servo apparatus containing digital computing equipment, which is capable of controlling an extremely complex and rapidly changing physical system while having adequate bandwidth for maintaining short term stability of the physical system.

It is another object of the invention to provide a digital servo apparatus for maintaining a complex predetermined relationship between conditions of a rapidly changing physical system by continually adjusting selected conditions of the system in accordance with the values of the other conditions in order to satisfy the predetermined relationship.

It is still another object of the invention to provide a digital servo apparatus for the control of a complex physical system wherein a selected condition of the system is directly adjusted by a closed, completely analog servo loop which has relatively large bandwidth sufficient for the maintenance of loop stability, while overall control of the system to maintain a predetermined relationship between the conditions of the system, is carried on by a cooperating partly digital servo loop, which may have relatively low bandwidth.

It is a further object of the invention to provide a digital servo apparatus for automatically directing an aircraft to a predetermined destination by controlling the heading of the aircraft in accordance with the air-speed, altitude, heading, and position of the aircraft with respect to ground.

It is yet another object of the invention to provide a digital servo apparatus for automatically directing an aircraft to a predetermined destination wherein the heading of the aircraft is directly adjusted and stabilized by an analog autopilot servo loop having relatively high bandwidth sufficient for the maintenance of loop stability, while overall control of the aircraft to maintain a predetermined relationship between the heading of the aircraft and the altitude, airspeed, and position of the aircraft with respect to ground is separately carried on by a cooperative partly digital servo loop which may have relatively low bandwidth.

According to the present invention, the above and other objects and advantages are attained by a digital servo apparatus, adapted for the control of a physical system, in which the system stabilizing and system controlling functions of the servo apparatus are carried on largely separately by two cooperating servo loops. The burden of providing short term stability for the physical system is carried by a completely analog servo loop which has adequate bandwidth for the maintenance of loop stability and which is coupled to and directly acts upon the physical system to maintain a selected condition or conditions of the system at a stable value.

The burden of providing overall control for the physical system to vary the selected condition so as to satisfy a predetermined relationship between all of the conditions of the system, is carried by a partly digital servo loop which may have relatively low bandwidth.

According to a preferred embodiment of the present invention, cooperation between the two servo loops is secured by inclusion of the analog servo loop within the main loop of the partly digital servo loop, control of the selected condition by the partly digital servo loop being effected indirectly through application of a control signal to the analog servo loop, the analog servo loop being responsive to the control signal for varying the selected condition in accordance with variations of the applied control signal.

With the described arrangement, any restriction of bandwidth within other portions of the partly digital servo loop cannot adversely affect the short term stability of the physical system, for any potential instability is corrected by the fast-responding, large bandwidth, analog servo loop. All other elements of the partly digital servo loop need only have sufficient bandwidth to meet the requirements imposed by the overall control problem. Thus, use of a conventional general purpose digital computer and associated digital input conversion and output conversion apparatus in the remaining portions of the partly digital servo loop becomes entirely feasible.

In the preferred embodiment of the present invention, a digital computer through its associated input conversion apparatus, periodically samples the conditions of the physical system, and from the data thus obtained, produces as a result of extensive computation, a digital control signal representative of a desired value for the selected condition.

An output conversion apparatus, hereinafter designated a "digital-to-analog coupler unit," is intercoupled between the digital computer and the analog servo loop for receiving the periodically produced digital control signals and applying corresponding analog control signals to the analog servo loop to control the functioning of the analog servo loop in the manner hereinbefore described.

The basic principles of the present invention have been embodied by way of example in a specific embodiment of the invention which is adapted for navigating an aircraft to a pre-selected destination by control of the heading of the aircraft in accordance with the altitude, airspeed, heading and ground position of the aircraft. In the partly digital servo loop, a digital control unit, which comprises a digital computer and associated input conversion apparatus, periodically samples the heading, altitude, airspeed and ground position of the aircraft to produce a corresponding digital control steering signal, representative of required changes in the heading of the aircraft. The digital steering signal is smoothed and converted to a corresponding analog control signal by a coupler unit which applies the analog steering signal to a completely analog autopilot servo loop. The autopilot servo loop has relatively large bandwidth, quite sufficient for maintaining stability of the aircraft, and is responsive to the applied analog steering signal for correcting the heading of the aircraft in accordance with the heading indicated by the analog steering signal.

The present invention, however, is not limited in scope of application to the automatic control and navigation of an aircraft. Those skilled in the art will recognize that the present invention will have useful application in a wide variety of control systems of the type characterized by a mode of operation wherein a predetermined relationship is maintained between conditions of a physcal system by continual adjustment of selected conditions of the system in accordance with the values of the other conditions in order to satisfy the predetermined relationship. For example, a control system for the regulation of a chemical reaction in the manner hereinbefore described, could with profit embody the basic principles of the present invention.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

Figure 1:
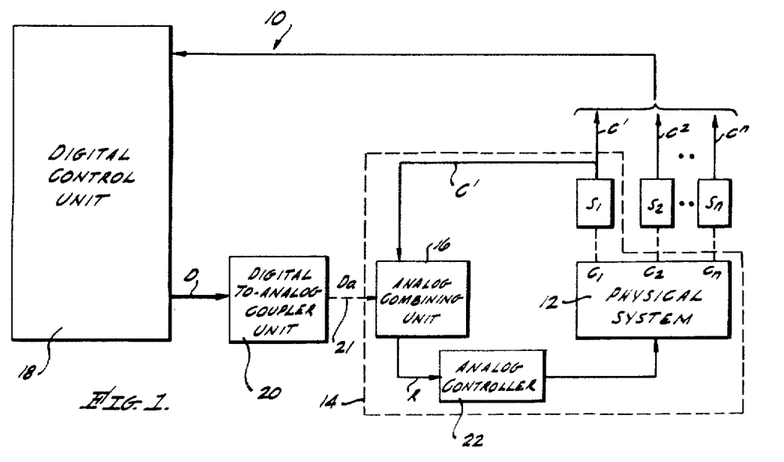
Fig. 1 is a generic block diagram showing a preferred embodiment of a digital servo apparatus according to the present invention.

Referring now to the drawings wherein like reference characters designate like parts throughout the several views, there is shown in Fig. 1 a partly digital servo loop generally designated 10 which is utilized for the control of a physical system 12. The partly digital servo loop 10 is adapted for controlling physical system 12 in such a manner as to maintain a predetermined relationship between a selected condition, designated $C_1$, of the physical system 12 and other conditions, designated $C_2$ through $C_n$, of the physical system, the partly digital servo loop 10 functioning to continually adjust the selected condition $C_1$ in accordance with the values of the other conditions, in order to satisfy the predetermined relationship.

Partly digital servo loop 10 comprises three principal elements, namely: A fully analog closed servo loop identified by the broken line 14 having relatively large bandwidth, for normally acting upon physical system 12 to maintain the selected condition $C_1$ of the system at a stable value corresponding to a predetermined reference, the analog servo loop also including an analog combining unit 16 responsive to the application of an analog control signal for effectively modifying the predetermined reference in accordance with variations of the analog control signal so that as a result of the normal operation of servo loop 10 the selected condition $C_1$ of the system is dynamically varied in accordance with variations of the applied analog control signal; a digital control unit 18 coupled to the physical system and responsive to the conditions of the physical system for periodically producing digital control signals, designated D, representative of desired values for the selected condition $C_1$ of the physical system, in accordance with the values of the other conditions of the system and a digital-to-analog coupler unit 20 intercoupled between digital control unit 18 and analog servo loop 14. Coupler unit 20 is responsive to digital control signals D for producing corresponding analog control signals designated $D_a$ and for applying the analog control signals $D_a$ to analog combining unit 16 to modify the reference for servo loop 14, and thereby adjust the selected condition $C_1$ of the system in accordance with digital control signal D. The operational connection between coupling unit 20 and analog servo loop 14 is indicated in Fig. 1 by a broken-line arrow 21.

As shown in Fig. 1, within main servo loop 10, sensing devices $S_1$, $S_2$ through $S_n$ intercoupled between physical system 12 and digital control unit 18, are provided for producing condition signals $C^1$, $C^2$ through $C^n$, respectively representative of the corresponding conditions $C_1$ through $C_n$ of the physical system. The condition signals produced by the sensing devices are periodically sampled by digital control unit 18 which, after each sampling operation converts the sampled condition signals to digital form where required, and performs extensive computations with this digital data in accordance with the predetermined relationship between selected condition $C_1$ and the other conditions $C_2$ through $C_n$, to produce the resultant digital control signal which, as stated hereinbefore, is representative of a desired value for the selected condition.

In view of the foregoing, it will be clear to those skilled in the art that digital control unit 18 may comprise a general purpose digital calculating machine, of a type well known in the data handling field, programmed for the solution of equations relating the selected condition $C_1$ to the other conditions $C_2$ through $C_n$, and equipped with suitable analog-to-digital input conversion apparatus for converting into digital form those condition signals which are not already in digital form. Digital data processing appartus of the described nature is well known in the art and it is not believed that detailed description of such equipment is required.

In the present invention the problem, hereinbefore described, of excessive bandwidth requirements upon the digital control apparatus is solved by providing a novel structure in which the control and stabilizing functions are in part separated. As shown in Fig. 1, for example, the burden of maintaining stability of physical system 12 for rapid variations in signal $C^1$ is carried by closed analog servo loop 14, which, as stated hereinbefore, has relatively large bandwidth, sufficient for the maintenance of loop stability. The computation of the control signal D, on the other hand, is separately carried out by digital control unit 18, the computed digital control signal D being added into analog servo loop 14 through coupler unit 20, as a relatively slowly varying analog signal $D_a$, which is applied to analog combining unit 16 of control servo loop 14.

The manner in which the analog control signal $D_a$ may be effective for the control of analog servo loop 14 may be better understood from the following description of the structure and operation of a particular embodiment according to the present invention of analog servo loop 14. As shown in Fig. 1, the embodiment of servo loop 14 comprises sensing device $S_1$, analog combining unit 16, and a conventional analog controller 22. Analog combining unit 16 is intercoupled between sensing device $S_1$ and controller 22, the combining unit receiving condition signal $C^1$ and control signal $D_a$ and combining these signals to form a resultant analog output signal R. Controller 22 is responsive to output signal R for acting upon physical system 12 to change condition $C_1$ of the system in such a manner as to maintain signal R at a predetermined value.

In the operation of analog servo loop 14, any change in condition $C_1$ of physical system 12 is detected by sensing device $S_1$ and is reflected as a corresponding change in the analog control signal $C^1$ which is produced by device $S_1$. Signal $C^1$ is combined in unit 16 with analog control signal $D_a$, the resultant analog output signal R being received by controller 22 which detects and responds to any difference between the signal R and a predetermined reference by acting upon system 12 to change condition $C_1$ in such a manner as to bring signal R into agreement with the predetermined reference. Thus in operation, controller 22 continually adjusts condition $C_1$ of system 14 so as to maintain signal R at a constant value.

As a result of the hereinabove described operation of controller 22, whenever the application of control signal $D_a$ to unit 16 causes a change in the resultant signal R, controller 22 effects a compensating change in condition $C_1$ so as to again return signal R to its original value. The effect therefore, of the application of control signal $D_a$ to servo loop 14 is to cause condition $C_1$ to be varied by the loop in accordance with the variations of the applied control signal $D_a$. Thus the value of condition $C_1$ is controlled by signal $D_a$, this control being effected indirectly by signal $D_a$ through analog servo loop 14, which stabilizes condition $C_1$ at new values in accordance with control signal $D_a$. The manner in which control signal $D_a$ may be effective for the control of servo loop 14 and the operation of loop 14 in controlling physical system 12 will be illustrated in greater detail with reference to Fig. 2 which shows a specific embodiment of the present invention.

Figure 2:
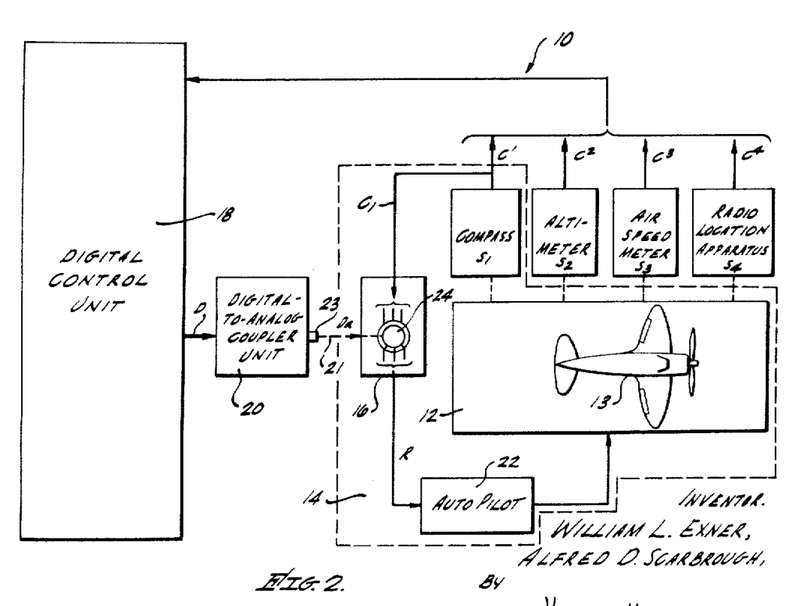
Fig. 2 is largely a block, partly a circuit diagram illustrating a specific embodiment of a digital servo apparatus, according to the present invention, which is adapted for directing an aircraft to a pre-selected destination.

Referring to Fig. 2 there is shown a specific embodiment of the invention which is adapted for navigating an aircraft 13 to a preselected destination. As shown in Fig. 2, the main partly-digital servo loop 10 includes sensing devices $S_1$ through $S_4$ coupled to the aircraft 13 (representing physical system 12) for producing condition signals $C^1$ through $C^4$ respectively representative of the heading direction, altitude, airspeed, and position of the aircraft.

Sensing devices $S_1$ through $S_4$, it is clear, may be conventional aircraft instruments. Signals representative of the heading, altitude and airspeed of the aircraft may be produced, for example, by a magnetic compass, an altimeter, and a true airspeed meter respectively, while signals representative of the position of the aircraft may be produced by any of a number of well known radio location systems such as the Shoran or Loran radio location systems.

In the navigation control system shown in Fig. 2, the basic function of digital control unit 18 is, to periodically sample the applied condition signals $C_1$ through $C_4$ transforming them into digital signals where required, and from the digital data thus obtained compute a desired heading change for the aircraft represented by digital control signal D. Thus each digital control signal D is representative of the heading error computed by the digital control unit for the conditions prevailing at a preceding time at which the condition signals were sampled. In the following description which is restricted to the detailed structure and operation of the navigation system shown in Fig. 2, control signal D will be referred to as the digital steering signal, this being a term which is aptly descriptive of the function in the system of signal D.

Digital-to-analogue coupler unit 20, as shown in Fig. 2, receives the digital steering signal D and applies a corresponding analog signal $D_a$ to analog servo loop 14, the analog signal $D_a$ being roughly representative of the time integral of the heading error which is represented by the steering signals D. Since the burden of providing aircraft stability is carried by analog servo loop 14, the bandwidth of coupler unit 20 may be greatly restricted without impairing aircraft stability. Indeed it becomes advantageous to so restrict the bandwidth of unit 20 in order to filter out high frequency components of the computed steering signal which might be generated in turbulent air and to produce a continuous smoothed analog signal $D_a$, from the necessarily discontinuous digital steering signal D. A detailed description of the structure and operation of a preferred embodiment of coupler unit 20 will be supplied hereinbelow in connection with the description of Fig. 3. However, it is helpful to state at this point that in the specific embodiment of Fig. 2 the analog signal $D_a$ produced by unit 20 is in the form of the rotation of an output shaft 23 which is mechanically coupled to a rotor 24 of combining unit 16, the operational connection between shaft 23 and rotor 24 being indicated by broken line arrow 21.

As shown in Fig. 2, combining unit 16 is a conventional differential synchro of the class known as a differential generator, a type of instrument which is commonly used for receiving electrical signals representative of the rotational position of a remote shaft and for modifying these signals by an amount corresponding to the position of its own rotor to produce a resultant modified electrical output signal. The modified output signal may be applied to a remote synchro motor or control transformer to position the rotor of the synchro motor or control transformer at a position corresponding to the modified output signal. Differential synchros are well known to the servo-mechanism art and are described, for example, in chapter 12, page 20 of the book "Principles of Radar" (second edition), by the Staff of the Radar School of the Massachusetts Institute of Technology, published in 1946 by McGraw Hill Co., New York.

Within servo loop 14, as shown in Fig. 2, combining unit 16 is intercoupled between sensing device $S_1$ which may be any compass for producing synchro output signals indicating the heading of the aircraft, and controller 22 which may be a conventional aircraft autopilot for directly controlling the heading of the aircraft. A commercial autopilot suitable for the present application, for example, is the type E–6 autopilot manufactured by the Minneapolis Honeywell Co. With the E–6 autopilot, all heading control is achieved through coordinated turns, the bank angle of the aircraft being a direct function of the heading error up to a predetermined maximum bank angle which is usually set at approxiamtely 20°. A suitable compass for the present application is the type J–2 Gyrosyn compass manufactured by the Sperry Gyroscope Co.

Those familiar with aircraft control equipment will immediately recognize that servo loop 14 differs from a conventional aircraft-autopilot control loop only in the feature that differential synchro-generator 16 is interposed between compass $S_1$ and autopilot 22 for the introduction of analog control signal $D_a$ into the servo loop. In an ordinary aircraft-autopilot control loop the synchro heading signals supplied by the compass are applied directly to the input of the autopilot, the autopilot then functioning to maintain the heading of the aircraft at a constant value. The interposition of differential generator 16 between compass $S_1$ and autopilot 22 allows the reference for servo loop 14 to be automatically varied in accordance with the rotational position of rotor 24 of differential synchro-generator 16.

In operation whenever rotation of rotor 24 produces a resulting change in the modified output signal R, autopilot 22 acts upon the aircraft to produce a compensating change in the heading of the aircraft so as to return signal R to its original value. Thus in general, for fairly low rates of rotation of rotor 24 the heading of the aircraft is maintained at values corresponding to the rotational position of rotor 24, deviations from the actual heading and the heading indicated by the rotor being quite small. However, when the rate of rotation of rotor 24 is large, corresponding to a rate of change of heading larger than that attainable by the aircraft with a maximum bank angle of 20°, the autopilot in effect becomes saturated and merely sets the aircraft into a fixed 20° banked turn, for the period of time in which the high rate of rotation of rotor 24 persists.

In view of the foregoing, it is clear that in practice, when the computed steering signal D indicates that a relatively large change of heading is required, there is no advantage to be gained by impressing, through coupler 20, a rotation corresponding to the whole of the indicated heading change upon rotor 24, in a single computation period. The impression of the full steering signal upon the rotor in the relatively short time of a computation period (assumed hereinafter to be one-half second) would only result in an excessive rate of rotation of rotor 24 which could not be followed by the aircraft. It is therefore advantageous for large values of the steering signal D to apply to rotor 24, in each computation period a rotation corresponding to only a portion of the indicated heading change, thereby allowing many computation periods for the correction of the aircraft heading. It is also advantageous to limit the rate of rotation of rotor 24 to a value which only slightly exceeds the maximum rate of heading change attainable by the aircraft-autopilot combination (said maximum rate of heading change being hereinafter assumed to be approximately 3° per computation period).

When through correction during several computation periods, as described above, an initially large steering signal is reduced to a relatively small value indicating that correction of heading is almost completed, allowance should be made for the time required for the aircraft to roll out of its 20° bank. It will be assumed that the aircraft utilized will require about five seconds to roll out of the 20° bank and will make an additional heading change of approximately 12.5° in rolling out of the bank. It is therefore advantageous that coupler 20 recognize when an originally large steering signal is reduced to a value in the neighborhood of 12.5°, and in response to such an occurrence, suspend further rotation of rotor 24 for five seconds, thereby allowing the normal roll-out of the aircraft to correct the residual heading error.

Figure 3:
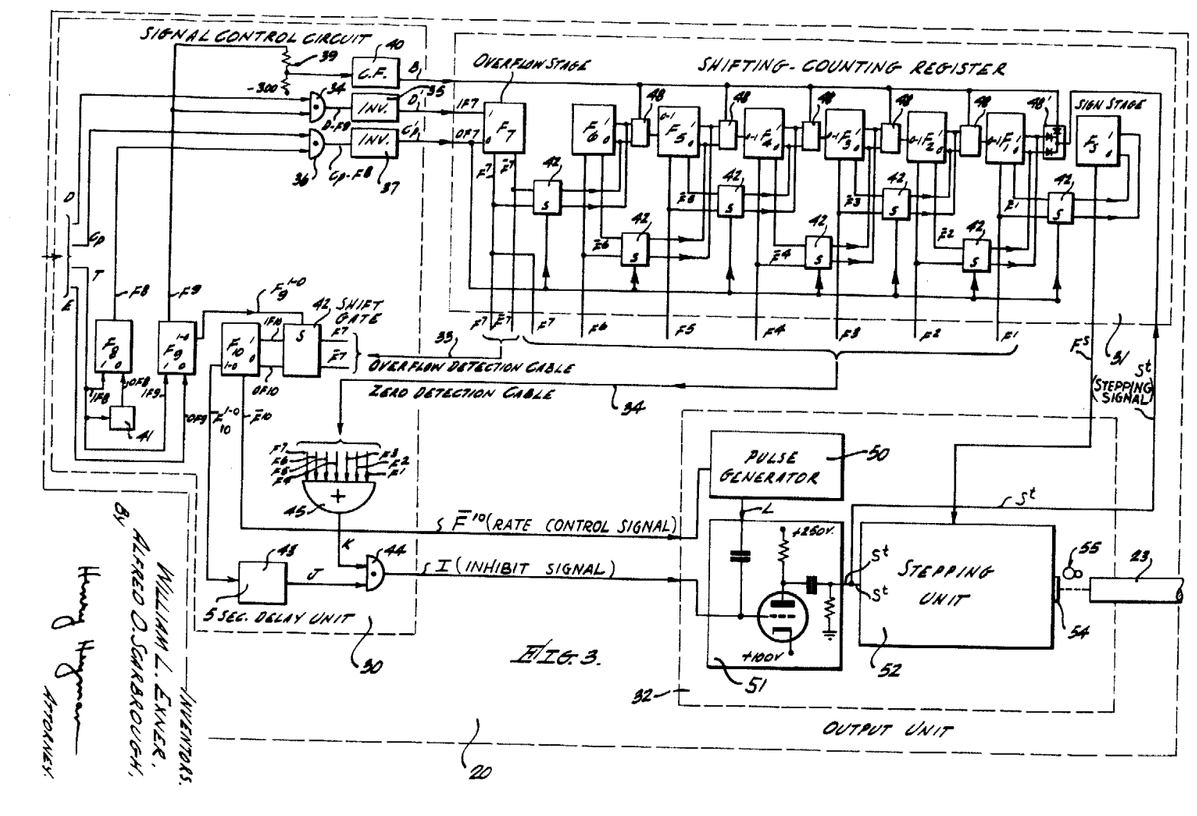
Fig. 3 is a detailed circuit diagram partly in block form showing a specific embodiment of a digital-to-analog coupler unit which is shown in block form in the apparatus of Fig. 2.

It is in general, necessary to adjust the characteristics of any particular embodiment of coupler unit 20 to fit the characteristics of the aircraft and autopilot utilized in the navigation system. A specific embodiment of coupler unit 20 incorporates each of the above described functions which particularly adapt coupler unit 20 for cooperation with an aircraft and autopilot having the hereinabove assumed characteristics. A detailed diagram of this specific embodiment of coupler unit 20 is shown in Fig. 3. Before proceeding with detailed description of the structure of coupler unit 20, as shown in Fig. 3, it is advisable to here briefly summarize the abovementioned functions which are performed by coupler unit 30 in the overall operation of the aircraft navigation servo loop.

Coupler unit 20, as identified by dotted lines in Fig. 3, receives from digital control unit 18 at the end of each computation period, the newly computed and generated digital control signal D, which is made available, according to one embodiment of unit 18, as a serial electrical signal train representative of the digits and of the sign of a sixteen digit binary number, the lowest order digit of the binary number representing a desired change in heading of one-fifth of a degree. In the serial signal train the presence or absence of a pulse at each digit time position represents the presence of a 1 digit or of a 0 digit in the binary number. For the earliest or first digit time position the presence or absence of a pulse indicates that the binary number has respectively negative or positive sign. The digit pulse representing the sign of the binary number is therefore applied first to coupler unit 20, and then the lowest order and succeedingly higher order digit pulses of the computed steering signal are serially applied. The application of signal train D to coupler unit 20 is preceded in time by the application of a transfer pulse, designated T applied over a separate conductor, and the completion of the transfer is signalled by the application of an end of transfer signal, designated E. In addition, clock pulses, designated $C_p$ are continuously applied to coupler unit 20 by digital control unit 18.

Those skilled in the art will recognize that clock pulse signals $C_p$, transfer signal T, and end of transfer signals E are ordinarily available in most digital computers for synchronization of internal circuits and of output equipment. Signal B is a blocking signal applied to carry circuits 48 and is applied in its high level state during the shift in period to prevent operation of the carry circuits and is applied in its low level state during the count down period to permit the propagation of carry signals during this latter period, as will be apparent hereinafter.

In response to the application of signal D and associated signals B, $C_p$, T, and E, coupler unit 20 functions to rotate its output shaft 23 in a sense determined by the sign of the number represented by signal D. When the magnitude of the desired heading change represented by signal D is less than 12.8°, for example, shaft 23 is rotated at a relatively low rate until either its total change in rotational position becomes equal to the desired change in heading or a new steering signal is applied. When a new steering signal is applied, the described operation is again repeated, the heading error being reduced in each computation period until entirely eliminated. However, if a new steering signal should represent a desired heading change in excess of 12.8°, the coupler unit shifts to a different mode of operation and rotates output shaft 23 at a relatively high rate of approximately 3° per computation period corresponding to the maximum rate of turn of the aircraft when set in a 20° bank, as explained hereinbefore. When, through correction for several periods, an originally large heading error (in excess of 12.8°) is reduced below 12.8°, the coupler unit recognizes this change, which indicates that correction is about to be completed and in response thereto, suspends further rotation of shaft 23 for five seconds, thereby allowing the normal roll-out of the aircraft to remove the residual heading error, as hereinbefore described. At the completion of the five second roll-out period, the coupler unit returns to its normal operation and responds to new steering signals in the manner described. It will be clear to those skilled in the art in view of the foregoing, that during those periods in which the heading error is less than 12.8° the total change of rotational position of shaft 23 tends to approximate the time integral of the computed heading error of the aircraft and must therefore for such periods be representative of a correct heading for the aircraft whenever the heading error, represented by signal D, is reduced to zero.

Having completed a summary of the functions of the preferred embodiment of coupler unit 20 as adapted for aircraft navigation, a detailed consideration of the corresponding structure of coupler unit 20 will now be given. It is seen in Fig. 3 that coupler unit 20 comprises three major elements, namely: a signal control circuit 30, an electronic shifting-counting and signal storage register 31, which is under the control of circuit 30 for the shifting-in of signal D during each period, and an output unit 32, for stepping output shaft 23 through successive discrete rotational positions in accordance with signals applied to output unit 32 by control circuit 30 and register 31. The output unit 32 also includes apparatus for simultaneously applying a single negative stepping pulse to an output conductor for each stepwise rotation of output shaft 23, the stepping pulses $S^t$ being applied to register 31 to count down the number held in the storage register.

Counting down will be defined as the reduction by one of the binary number contained in the register for each application of a stepping pulse $S^t$. It will become clear hereinafter that the total count-down to zero of a number which has been shifted into register 31 indicates that shaft 23 has simultaneously been stepped through an angle corresponding to the full heading correction represented by the original shifted-in steering signal.

As shown in Fig. 3, control circuit 30 is adapted for receiving the signals D, $C_p$, T and E from digital control unit 18 and for applying a pair of signals, a blocking signal B, and a modified clock pulse signal $C_p'$ and also an inverted steering signal D' to register 31, the signals B and $C_p'$ being applied in each period to control the shifting into said register of signal D' for storage therein. It will be noted in Fig. 3 that the three conductors carrying signals B, D' and $C_p'$ from circuit 30 to register 31 are themselves designated B, D' and $C_p'$ respectively, it being felt that the designation of conductors by the signals carried is not only economical of drawing space but lends clarity to the following description. Register 31 comprises an eight stage electronic storage register, which is adapted both for shifting-in of steering signal D' and for counting-down of the shifted-in signal by stepping signal $S^t$, the storage register utilizing eight identical flip-flop circuits $F_s$, $F_1$, $F_2$ through $F_7$ for storage of the digits of the steering signal. Flip-flop $F_s$, which is designated the sign stage, stores the sign digit of the steering signal, flip-flops $F_1$ through $F_6$ store the six lowest order digits of the steering signal, and flip-flop $F_7$ which is designated the overflow stage, is adapted for registering the presence of a binary 1 for any of the digits above the sixth digit of the steering signal. The application of blocking signal B to register 31 during shifting-in of signal D' serves to inhibit the propagation of carry signals from stage to stage of the register, to thereby prevent such carry propagation from interfering with the shifting-in process. The application of the $C_p'$ signal, which, as will be described in detail, comprises seven modified clock pulses selected from the continuous clock pulse signals $C_p$, serves to direct the shifting of the digits of the steering signal D' from flip-flop $F_7$ through the remaining seven flip-flops of register 31.

Each of the flip-flops $F_1$ through $F_7$ applies a pair of complementary voltage signals, representative of the state of the flip-flop to corresponding output conductors. The overflow stage flip-flop $F_7$, for example, applies complementary signals $F^7$ and $\bar{F}^7$ to correspondingly designated output conductors, signal $F^7$ having a high and low voltage level respectively when flip-flop $F_7$ is in its 1 representing and 0 representing states, complementary signal $\bar{F}^7$ having low and high voltage levels respectively when flip-flop $F_7$ is in the same 1 and 0 representing states. The output signals of the other flip-flops are similarly related to the states of the flip-flops originating the signals.

Signal conductors $F^7$ and $\bar{F}^7$ are gathered together in an overflow detection cable 33, which connects register 31 with signal control circuit 30 to enable circuit 30 to detect the presence of a binary 1 in the overflow stage $F_7$. It will be realized that the presence of a binary 1 in the overflow stage after a complete shift-in of a steering signal indicates that the newly shifted-in steering signal represents a desired heading change in excess of 12.8°. It will be remembered that the lowest order digit of the steering signal represents an angle of $\pm\frac{1}{5}°$ and therefore the six stages $F_1$ through $F_6$ of register 31 are able to represent in the ordinary binary code an angle equal to $2^6 \times \frac{1}{5}°$, which is 12.8°; a binary 1 in flip-flop $F^7$ therefore representing an angle in excess of 12.8°.

Signal conductors $F^1$ through $F^7$ are gathered together in a zero detection cable 34 which is also connected between register 31 and control circuit 30 to enable circuit 30 to detect when all of the flip-flops $F_1$ through $F_7$ contain binary 0's, such a condition, it is clear, indicating that a total count-down has been accomplished and that no further heading change is required. To complete the enumeration of the output signals produced by register 31, it is pointed out that sign stage flip-flop $F_s$ has a single output conductor $F^s$ which is connected to output unit 32 and through which the corresponding flip-flop output signal $F^s$ is applied to control the sense of rotation of shaft 23 by output unit 32.

Output unit 32 also receives a rate-control signal $\bar{F}^{10}$ and an inhibit signal I over correspondingly designated conductors from control circuit 30. The method of generating signals $\bar{F}^{10}$ and inhibit signal I will be explained hereinbelow. The output unit is adapted for maintaining a high rate of stepwise rotation of output shaft 23 (and a correspondingly high rate of production of stepping pulses $S^t$) when rate-control signal $\bar{F}^{10}$ is at a low level, the rate of shaft rotation and of pulse production being reduced to a relatively low rate when signal $\bar{F}^{10}$ is at a high voltage level. Output unit 32 is responsive to inhibit signal I for the suspension of its normal functioning whenever signal I is at a low voltage level, the stepwise rotation of shaft 23 and simultaneous production of stepping pulse $S^t$ being then stopped or inhibited until signal I is returned to its high level. Each stepwise rotation of output shaft 23 of unit 32, turns the shaft through an angle of $\frac{1}{5}°$ while the simultaneously produced stepping pulse $S^t$ is effective for reducing by one the count in register 31, thereby reducing the angle represented by said count by $\frac{1}{5}°$. It therefore becomes clear that a total count-down to zero of a number contained in register 31 indicates that full heading correction has been accomplished by a simultaneous stepping of shaft 23 through the full angle represented by the original shifted-in steering signal.

A description of the interconnections between control circuit 30, register 31, and output unit 32 having been completed, there will now be considered in some detail the function and structure of control circuit 30 as shown in Fig. 3. It will be remembered that in each computation period circuit 30 receives the steering signal D, transfer signal T, end-of-transfer signal E, and clock pulse signals $C_p$ from digital control unit 18, and in response thereto applies signals B and $C_p'$ to register 31 to control the shifting-in of inverted signal D' into register 31. In addition, control circuit 30 further receives signals $F^7$ and $\bar{F}^7$ for detecting the state of overflow flip-flop $F_7$ (a 1 state of flip-flop $F_7$, it will be remembered, indicating that the shifted-in number in register 31 represents an angle in excess of 12.8°) and in response to the registration of overflow by said flip-flop, lowering rate control signal $\bar{F}^{10}$ to its low level to thereby increase the rate of rotation of shaft 23 by output unit 32 to send the aircraft into a rapid banked turn. However, when flip-flop $F^7$, in successive computation periods, changes from its 1 state to its 0 state (indicating that an originally large heading error has been reduced below 12.8°) control circuit 30 functions to lower inhibit signal I to its low voltage level for a period of five seconds, thereby suspending the normal stepping operations of output unit 32 for five seconds to allow time for the normal roll out of the aircraft to correct the residual heading error. Control circuit 30 further functions to reduce inhibit signal I to its low level whenever the signals $F^1$ through $F^7$, applied to circuit 30 over cable 34, are all at their low levels (including that the count in the register has been reduced to zero), thereby suspending further rotation of shaft 23 by unit 32 at the time when the zero count in register 31 indicates that full heading correction has been achieved.

As shown in Fig. 3, within circuit 30, signal conductor D is connected to one input of a two input "and" gate indicated by a symbol 34, the other input to "and" gate 34 is connected to an output conductor $F^9$ of a flip-flop $F_9$. An "and" gate is a circuit, well known in the art, for producing a high voltage level output signal only when all of the signals applied to its inputs are at their high voltage levels. "And" gate 34, for example, produces an output signal D.F⁹ (where (.) is a symbol representative of the logical "and" operation) which is at its high voltage level only when both input signals, D and F⁹, are at their high voltage levels. Signal D.F⁹ is applied to an inverting amplifier 35 which inverts signal D.F⁹ to produce signal D'; signal D' being definable by the logical signal function $\bar{D}.F^9$ (where the bar (—) indicates the logical complementation or inversion operation).

If the high voltage level of a signal be designated a 1 level and the low voltage level of a signal be designated as a 0 level, it will be seen that the notation used in the preceding paragraph is exceedingly powerful for displaying the relationship between the voltage levels of an output signal and the voltage levels of the component input signals, the level of an output signal being determinable by the ordinary rules of multiplication. For example, if F⁹ is high (1), and signal D is high (1), then output signal D.F⁹ equals 1.1 and will therefore be at a 1 representing or high level. In the same manner, if signal D is low (0), and signal F⁹ is high (1), then output signal D'.F⁹ equals 0.1 and is therefore at a 0 representing (low) level.

Referring still to circuit 30, it is seen that clock pulse signal $C_p$ and an output signal F⁸ of a flip-flop $F_8$ are applied to the two inputs of an "and" gate 36 to form an output signal $C_p.F^8$ which is applied to an inverting amplifier 37 to form a signal $\bar{C}_p.F^8$ which is of course the signal earlier designated $C_p'$. The signal F⁹ is further applied to a voltage divider generally designated 39, whose output is connected to the input circuit of a cathode follower 40 which supplies carry-blocking signal B to register 31.

Transfer signal T is applied to an input conductor 1F8 of flip-flop $F_8$, to the input circuit of a delay element 41, and to an input conductor designated 1F9 of flip-flop $F_9$. The output of delay element 41, which delays an input signal for a time corresponding to the arrival of seven clock pulses, is connected to an input conductor 0F8 of flip-flop $F_8$. End of transfer signal E is applied to an input conductor 0F9 of flip-flop $F_9$. In explanation of the notation adopted for flip-flop input conductors, it is stated that the application of a negative pulse, for example, to input conductor 1F8 is effective for setting flip-flop $F_8$ to its 1 state while the application of a negative pulse to input conductor 0F8 is effective for setting flip-flop $F_8$ to its 0 state. Each of the other flip-flops is similarly responsive to the application of negative signals applied to its corresponding input conductors.

Figure 4:
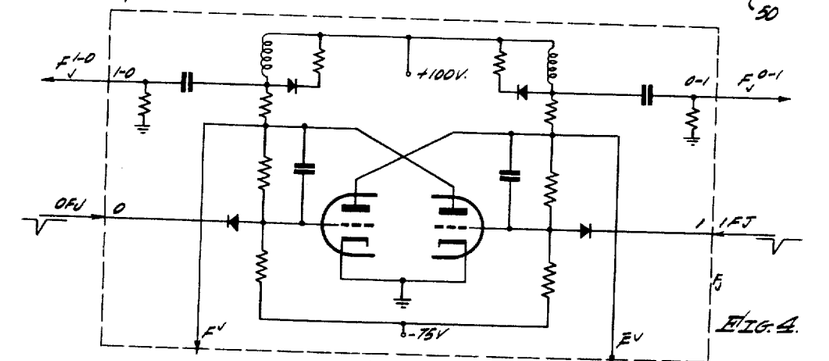
Fig. 4 is a circuit diagram showing in detail the structure of an electronic flip-flop circuit suitable for utilization in the coupler unit shown in Fig. 3.

In further explanation of the adopted flip-flop notation, and for clarification of certain features of flip-flop operation, reference is made to Fig. 4 which shows a preferred embodiment of a flip-flop designated flip-flop $F_j$ (where *j* is any integer) which may be utilized in the present invention. Flip-flop $F_j$ as shown in Fig. 4 is conventional in design and comprises two triode amplifiers whose plate and grid circuits are symmetrically cross-coupled so that only one of the triode amplifiers can be conductive. The flip-flop is in its 1 state when one of the amplifiers is conductive and in its 0 state when the other amplifier is conductive. Application of a negative signal to an input conductor 1F*j* sets the flip-flop to its 1 state while application of a negative signal to another input conductor 0F*j* sets the flip-flop to its 0 state. Simultaneous application of negative signals to both input conductors causes the flip-flop to trigger (reverse its state). The flip-flop has two pairs of output conductors, F$^j$ and $\bar{F}^j$, and $F_j^{1-0}$ and $F_j^{0-1}$. The flip-flop applies a negative pulse to its $F_j^{1-0}$ output conductor whenever the flip-flop changes from the 1 state to the 0 state, and similarly applies a negative pulse to its $F_j^{0-1}$ output conductor whenever the flip-flop changes from its 0 state to its 1 state. In addition, the flip-flop applies voltage level signals to its F$^j$ and $\bar{F}^j$ output conductors in accordance with its state, as has already been described hereinbefore. In view of the clearly conventional nature of the circuit of flip-flop $F_j$, it is not believed that further detailed description is required of the operation of the circuit.

Continuing with the detailed description of circuit 30, as shown in Fig. 3, it is seen that an $F_9^{1-0}$ output conductor of flip-flop $F_9$ is connected to an input (designated S) of a shift gate 42 which receives signals F⁷ and $\bar{F}^7$ from overflow stage $F_7$ and passes a negative input signal applied from flip-flop $F_9$ to either a 1F10 or 0F10 input conductor of flip-flop F10, to set F10 to a state agreeing with the state of flip-flop $F_7$.

A specific embodiment of shift gate 42 will be described hereinafter in connection with the detailed description of Fig. 5. However, it can be stated at this point that shift gate 42 functions to pass an applied input signal to conductor 1F10 whenever signal F⁷ is at its high level (indicating that the originating flip-flop $F_7$ is in the 1 state) or alternatively to pass the applied input signal to conductor 0F10 whenever signal $\bar{F}^7$ is at its high level (indicating that flip-flop $F_7$ is in its low state). Flip-flop F10 has an output conductor $\bar{F}^{10}$ which is directly connected to output unit 32 to supply the rate control signal, and a second output conductor $F_{10}^{1-0}$ which is connected to the input circuit of a 5 second delay unit 43 which is adapted for receiving the signal $F_{10}^{1-0}$ and in response thereto raising an output signal J to its high level for a period of 5 seconds, the J signal being applied to one input of a two terminal "and" gate 44. The other input terminal of the "and" gate receives a signal K from an "or" gate indicated schematically at 45 which is adapted for receiving the signals F¹ through F⁷ (supplied over zero detection cable 34) and for raising its output signal K to a high level whenever anyone of the applied input signals F¹ through F⁷ is at its high level. "Or" gates of the type described are well known in the prior art and do not require further description. Output signal K is therefore definable by the signal function, $$K = F^1 + F^2 + F^3 + F^4 + F^5 + F^6 + F^7$$

where the (+) is a symbol indicating the logical "or" operation. In response to the application of input signals K and J, "and" gate 44 produces as an output signal, inhibit signal I which, it will be remembered, is applied to output unit 32. Inhibit signal I is therefore definable by the signal function J.K.

Detailed description of the structure of control circuit 30 having been completed, it would now be appropriate to consider in detail the operation of circuit 30. However, in practice the operation of circuit 30 is so inextricably interwoven with the operation of the other major units of coupler 20 (namely register 31, and output unit 32), that it is felt that clarity of disclosure will be best obtained by presentation of a description of overall operation of coupler unit 20 at a later point following detailed description of the structure of register 31 and unit 32.

Referring now in some detail to the structure of output unit 32 as shown in Fig. 3, it will be remembered that unit 32 is adapted for producing stepwise rotation of output shaft 23 and for simultaneously applying a negative pulse to conductor S$^t$ for each stepwise rotation of shaft 23, the sense of stepwise rotation being controlled by signal F$^s$ and the rate of shaft rotation (and of production of stepping pulses for count-down of register 31) being controlled by rate control signal $\bar{F}^{10}$. It will also be remembered that output unit 32 is responsive to inhibit signal I, at its low level, for suspending normal stepping operations. As shown in Fig. 3, rate control signal $\bar{F}^{10}$ is applied to a pulse generator 50 which is adapted for producing positive output pulses L at a rate determined by the voltage level of signal $\bar{F}^{10}$, signal L having a relatively high pulse repetition rate of approximately 30 pulses per second when signal $\bar{F}^{10}$ is at its low level, and having a relatively low pulse repetition rate when signal $\overline{F^{10}}$ is at its alternative high level. Many possible embodiments of pulse generator 50 may be visualized by those familiar with the electronic switching art. However, for purposes of clarification, a preferred embodiment of pulse generator 50 will be described hereinbelow in connection with the detailed description of Fig. 6.

As shown in Fig. 3, the signal L produced by pulse generator 50 is applied to one input of a conventional vacuum-tube inhibit gate 51, the other input of gate 51 being directly connected to inhibit signal conductor I. The output signal of gate 51 is stepping signal $S^t$. Gate 51 is adapted for normally lowering output signal $S^t$ to its low voltage level each time that signal L is raised to its high level, this normal operation of gate 51 being inhibited or blocked when inhibit signal I is at its low level. In view of the foregoing, signal $S^t$ is seen to be definable by the signal function $\overline{L}.\overline{I}$. It is clear that signal $S^t$ can be described as a sequence of negative pulses, a negative pulse being produced each time that a positive pulse is applied to gate 51 by generator 50, the application of negative pulses to conductor $S^t$ being stopped whenever inhibit signal I falls to its low level. Within output unit 32 conductor $S^t$ is branched, one branch of conductor $S^t$ being connected to register 31 to supply stepping signals for count down of the register, and the other branch of conductor $S^t$ being connected to the input of a stepping unit 52 which has an output shaft 54 coupled through a mechanical gear reduction, symbolically indicated at 55, to output shaft 23. Stepping unit 52 also receives the sign control signal $F^s$ from sign stage $F_s$ of register 31.

Figure 7:
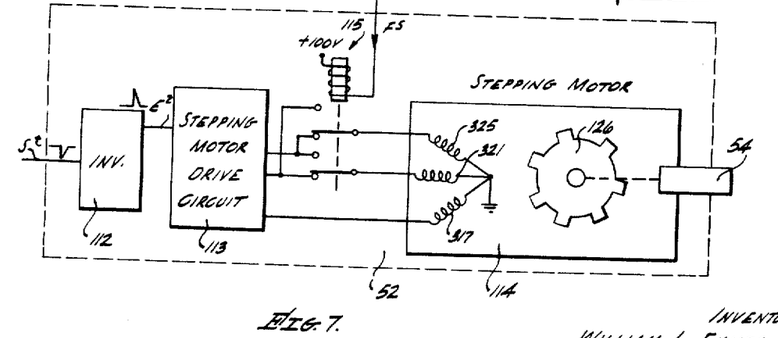
Fig. 7 is a circuit diagram, partly in block form, illustrating a specific embodiment of a stepping unit shown in block form in Fig. 3.

In function, stepping unit 52 is adapted for stepping shaft 54 through a discrete stepwise rotation for each application of a negative pulse to input conductor $S^t$, the sense of stepwise rotation being determined by the voltage level of signal $F^s$. A gear reduction ratio is adopted such that each stepwise rotation of shaft 54 causes a corresponding rotation of output shaft 23 of $\frac{1}{5}°$. Those skilled in the art will readily visualize many possible embodiments of stepping unit 52. For example, one possible embodiment may comprise the motor stepping circuit and stepping motor shown in Figs. 8 and 9 of a paper entitled "Input Devices" by L. D. Wilson and D. Roggenstein which is published in "Review of Input and Output Equipment Used in Computing Systems" (Joint AIEE–IRE–ACM Computer Conference, March 1953, published by the American Institute of Electrical Engineers). Another suitable embodiment for stepping unit 52 is shown in Fig. 7 and is described hereinbelow in connection with the detailed description of Fig. 7.

Referring now in some detail to the structure of register 31 as shown in Fig. 3, it will be recalled that register 31 is adapted both for shifting-in of the applied steering signal $D'$ (under the control of signals B and $C_p'$) and for counting-down of the count contained in the register, after shifting-in has been completed, in response to the application of stepping signal $S^t$. As shown in Fig. 3, signal $D'$ is applied to a 1F7 input conductor of overflow stage $F_7$ to set that stage to its 1 state whenever signal $D'$ is at its low level. Signal $C_p'$ is applied to the 0F7 input conductor of the overflow stage and is also applied to the S inputs of seven additional identical shift gates 42 which intercouple the stages of the register to provide for the shifting of information from stage to stage in response to the application of negative pulses along conductor $C_p'$. As shown in Fig. 3 each of the shift gates 42 receives a pair of complementary control signals from a higher order stage and has a pair of output conductors connected respectively to the 1 setting and 0 setting input conductors of a succeeding lower order stage, a shift gate 42 being also provided intercoupled between the lowest order stage $F_1$ of the register and the sign stage $F_s$. It will be clear to those skilled in the art that the application of steering signal $D'$ to the 1F7 input of flip-flop $F_7$ will cause the flip-flop to be successively set to its 1 state in accordance with the presence of binary 1 digits in the applied steering signal. It will also be clear that the application at times corresponding to the intervals between digit representing portions of signal $D'$ of negative signals to conductor $C_p'$, will cause the successive states of flip-flop $F_7$ to be, in effect, shifted through the register, each application of signal $C_p'$ at its low level causing each lower order stage of the register to be set to the state which had been previously maintained by the immediately higher order stage. Shifting of flip-flop states through register 31 is effected through the shift gates 42 in the manner hereinbefore described.

Blocking signal B is applied to the input of six identical carry circuits 48 which intercouple the stages of the register for the propagation of carry signals from stage to stage during the count down operation of the register. When signal B is at its low level, carry circuits 48 are able to continue their normal carry propagating function. However, the application of blocking signal B at its high level (during the shifting-in operation) serves to block or inhibit the propagation of carry signals which might otherwise interfere with the shifting operation. As shown in Fig. 3, no facilities are provided for propagation of carry signals from flip-flop $F_6$ to overflow stage $F_7$, it therefore being apparent that the count-down operation can never affect the state of the overflow stage. It is further seen that stepping signal conductor $S^t$ is applied to the input of the carry circuit 48', which is coupled to the input conductors of the first stage F1 of the register. For this carry circuit 48' the internal structure is shown in detail, by way of example, and the carry circuit is seen to comprise three rectifiers whose cathodes are connected together to a common input terminal and whose anodes are respectively connected to the B conductor and to the 1F1 and 0F1 input conductors of flip-flop $F_1$. For the carry circuit 48' associated with flip-flop $F_1$ the input terminal of the carry circuit is connected to the stepping signal conductor $S^t$. It will be clear that every application of a negative pulse along conductor $S^t$ (during the count-down operation) will result in the simultaneous application, through circuit 48', of negative pulses to both input conductors of flip-flop $F_1$ thereby causing flip-flop $F_1$ to trigger or change its state for each stepping pulse applied. For the flip-flop $F_1$ each change of state from its 0 to its 1 state results in the application by the flip-flop of a negative carry pulse to its $F_1^{0-1}$ output conductor which is connected to the input terminal of the succeeding carry circuit, each carry pulse thereby causing a change of state of the succeeding flip-flop $F_2$. Each pair of the further succeeding flip-flops $F_2$ through $F_6$ is similarly intercoupled and it will therefore be clear to those familiar with binary scaling circuits that for register 31, every application of a negative signal to input conductor $S^t$ will result in a count-down or reduction by one of the total count contained in register 31.

Count-down, however, is suspended whenever blocking signal B is at its high level, for when signal B is at its high level those rectifiers in carry circuits 48 which are directly connected to conductor B become strongly conducting and thereby effectively short circuit each of the common input terminals of circuits 48 to the relatively low output impedance of cathode follower 40. Thus, with signal B at its high level, negative carry signals cannot propagate through the carry circuits 48 but are shunted into cathode follower 40. Stepping signals $S^t$ are similarly shunted to the low impedance of cathode follower 40 through the carry circuit 48 connected to flip-flop $F_1$, thereby causing both count-down of register 31 and rotation of output shaft 54 to be stopped during the period when blocking signal B is at its high level. However, it should be noted that inhibition of rotation of shaft 54, during the period when blocking signal B is at its high level, is not necessary since the shift-in period is so short that it is improbable that a stepping pulse $S^t$ will be produced during the shift-in period.

Having completed detailed description of the structure of coupler unit 20, as shown in Fig. 3, there will now be described, by way of example and in detail, the operation of coupler unit 20 for the following assumed conditions: It will be assumed in this example of operation that during an immediately preceding computation period, heading error was entirely corrected and that therefore all the flip-flops $F_1$ through $F_7$ of register 31 were left in the 0 state. It is also assumed that during the present computation period, digital control unit 18 has calculated from the information supplied it that there has arisen a negative heading error of one degree, the control unit 18 therefore applying to coupler unit 20 a corresponding steering signal D whose successive voltage levels represent the decimal count $-5$ in the conventional binary code representation. It will be remembered that the successive voltage levels of signal D' represent the sign and successively higher order digits of the binary code representation of the steering signal. It should be noted that the number $-5$ is represented in binary code as the binary number 101.(1); where the digit in parentheses indicates that the sign of the number is negative and the succeeding digits, whether 1 or 0, represent the presence or absence respectively, of the successive powers of the number two. Thus, the binary number 101.(1) equals $-(1.2^2 + 0.2' + 1.2^0)$ which equals $-5$.

In the operation to be described, the digits of the steering signal are shifted into register 31 and after shift-in has been completed, stepping signals $S^t$ are applied to register 31 to decrease the count in the register until a count of zero is reached, control circuit 30 recognizing the attainment of zero count and lowering inhibit signal I to its low level to prevent further production of stepping pulses and accompanying rotation of shaft 23. Throughout the description of operation, constant reference is made to voltage wave forms as functions of time of signals cooperating in the operation, these wave forms being shown in Figs. 8 and 9 respectively.

Figure 8:
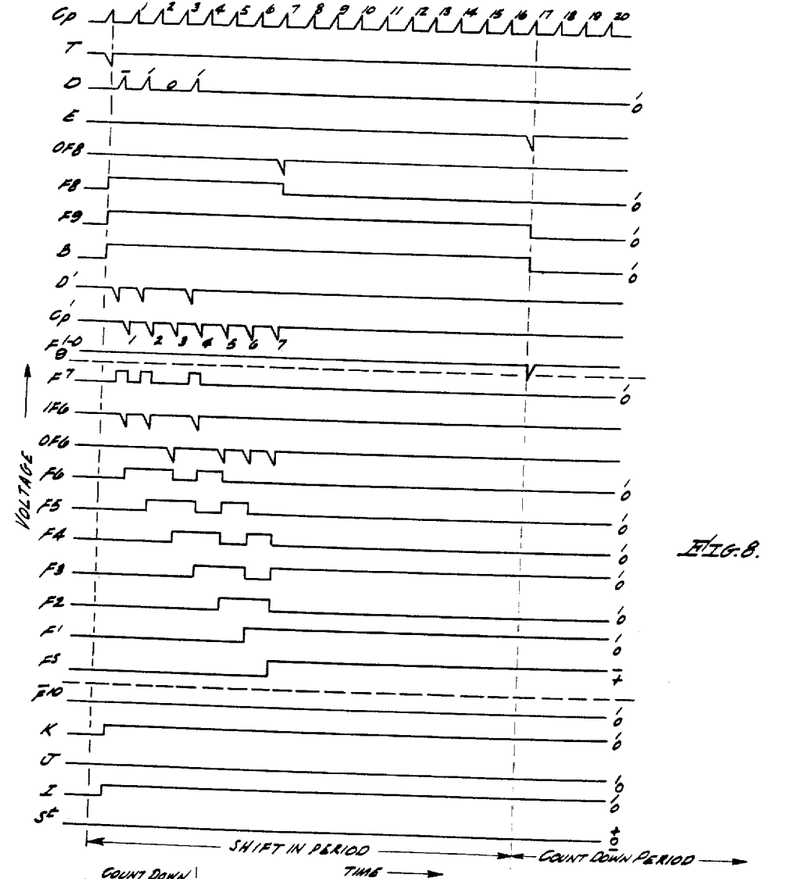
Fig. 8 is a chart illustrating wave forms of a number of electrical signals which are produced during an initial period of operation of the coupler unit of Fig. 3, which is called the "shift-in period"
Figure 9:
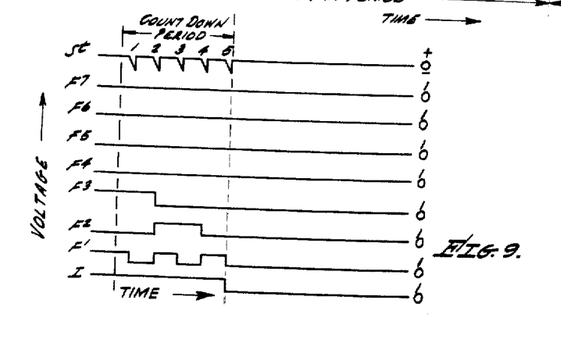
Fig. 9 is another wave form chart showing on a greatly reduced time scale, continuing waveforms, for a "count-down-period" of operation, of several signals whose waveforms are first illustrated in Fig. 8 for an immediately preceding "shift-in-period" of operation of the coupler unit of Fig. 3.

Beginning now, a detailed analysis of the operation of coupler unit 20, shown in Fig. 3, under the above assumed conditions, it is clear from the voltage wave forms presented in Fig. 8 that clock signal $C_p$ is continuously applied to circuit 30, while signal D' is applied only at the end of each computation period, that is at the beginning of each shift-in period. Transfer signal T is applied at a time immediately preceding the application of signal D, to indicate to circuit 30 that a transfer or shift-in operation is about to begin. At the left side of Fig. 8 a broken vertical line indicates for each of the wave forms, the time corresponding to the beginning of the transfer while a later broken vertical line at the right of Fig. 8 indicates the time at which end-of-transfer signal E is applied corresponding to the completion of the transfer, the period corresponding to the interval between the vertical lines being designated as the "shift-in period," while the time period succeeding the shift-in period is designated the "count-down period."

It is clear, from consideration of Fig. 3, that the application of signal T causes flip-flops $F_8$ and $F_9$ to be set to their 1 state, these changes of state being indicated in Fig. 8 by the corresponding rise to their high levels of signal $F^8$ and $F^9$. Flip-flop $F_8$ is reset at a latter time to its zero level by output signal 0F8 of delay unit 41, the delay between application of transfer signal T and signal 0F8 corresponding to the time required for the application of 7 clock pulses. For convenience in description, the successive clock pulses of signal $C_p$, as shown in Fig. 8, during the shift-in period, are numbered 1, 2, 3, etc. Flip-flop $F_9$ is not reset until the end-of-transfer signal E is applied to its 0F9 input conductor. The output signals of the flip-flops, signals $F^8$ and $F^9$ are supplied to "and" gate 36 and to cathode follower 40 and "and" gate 34 respectively, for the production of signals B, D' and $C_p'$. It will be remembered that signals B, D' and $C_p'$ are definable by the following signal functions:

$$B = F^9$$
$$D' = \overline{D.F^9}$$
$$C_p' = \overline{C_p.F_8}$$

Accordingly, as seen in Fig. 8, signal B is at its high level whenever signal $F^9$ is at its high level. Similarly, signal D' is at its low level only when both signal $F^9$ and signal D are at their high levels. Finally, it is clear that clock pulse signals are applied to conductor $C_p'$ only when signal $F^8$ is at its high level, signal $C_p'$ therefore, as shown in Fig. 8, comprising only seven clock pulses selected from the continuous clock pulse signal $C_p$.

It will be remembered that signal B, at its high level, is effective to block normal carry propagation in register 31 and that the seven clock pulse signals $C_p'$ are effective to control the shifting-in through register 31 of the digits of signal D'. It will also be recalled that the choice by circuit 30 of the mode of operation to be followed after the completion of the shift-in period, is largely determined by the state of overflow stage F7 at the completion of the shift-in period. This state is indicated to circuit 30 by a transfer of state from flip-flop $F_7$ to flip-flop $F_{10}$ which is accomplished, at the end of the shift-in period in response to the application of signal $F_9^{1-0}$ to the shift gate 42 intercoupled between flip-flops $F_7$ and $F_{10}$. The further description of the operation of control circuit 30 is therefore deferred until a complete description of the shift-in operation into register 31 has been completed so that it will be possible to determine the final state of overflow stage $F_7$ at the end of the shift-in period.

As shown in Fig. 3, the signal D' is applied to the 1F7 input conductor of overflow stage $F_7$ of register 31, and the clock pulse signals $C_p'$ are applied to the corresponding 0F7 conductor (and also to the S input circuits of all the shift gates 42 of register 31). In response to the application of the D' and $C_p'$ signals, flip-flop $F_7$ is successively set to states corresponding to the successive digits of the steering signal D', these successive states of flip-flop $F_7$ being indicated in Fig. 8 by the successive voltage levels of output wave form $F^7$. Each clock pulse signal applied along conductor $C_p'$ to the shift gates is effective for shifting the state of flip-flop $F_7$ to flip-flop $F_6$, a similar shift of state being also accomplished between the other flip-flops of the register.

For purposes of clarification, the wave forms 1F6 and 0F6 are shown in Fig. 8. These wave forms, it is clear, are produced as a result of the successive application of the clock pulse signals $C_p'$ to that shift gate 42 which intercouples overflow stage $F_7$ and flip-flop $F_6$. Flip-flop $F_6$ is set to the 1 state by each negative pulse of signal 1F6 and is set to the zero state by each negative pulse of signal 0F6, the successive states of flip-flop $F_6$ being indicated in Fig. 8 by the corresponding output $F^6$. The wave forms $F^5$, $F^4$, $F^3$, $F^2$, $F^1$, and $F^s$ are also shown in Fig. 8. The high level of each of these wave forms, it will be clear, represents that the corresponding flip-flop is in the 1 state and the low level indicates that the corresponding flip-flop is in the 0 state. It is obvious from Fig. 8 that (for the particular steering signal D' which is being considered) at the time of application of the seventh clock pulse all of the flip-flops $F_s$, $F_1$, through $F_7$, of register 31, are set to their final states for the shift-in period.

It will also be clear that had another steering signal D' been applied, having digits above the seventh digit position, such application would have served to set flip-flop $F_7$ to its 1 state to register overflow. However, in the present example, because of the small size of the steering signal, no overflow is registered by flip-flop $F_7$. The further mode of operation of circuit 30, for the present example, is therefore completely determined and may be further described.

Continuing once again with description of the operation of register 31—at the completion of the shift-in period the state of overflow stage $F_7$ is transferred to flip-flop $F_{10}$ in response to the application of signal $F_9^{1-0}$ to the shift gate 42 interconnecting flip-flops $F_7$ and $F_{10}$. In the present example, the final state of flip-flop $F_7$ at the completion of the shift-in period, is the 0 state and therefore at this time flip-flop $F_{10}$, which was formerly in the 0 state, remains in the 0 state. This failure of flip-flop $F_{10}$ to change state is indicated by output wave form $\overline{F^{10}}$ which, as shown in Fig. 8, remains at its high level after the application of pulse $F_9^{1-0}$. It will be remembered that signal $\overline{F^{10}}$ is the rate control signal and is effective at its high level to cause pulse generator 50 to operate at a relatively low pulse repetition rate.

Inasmuch as flop-flop $F_{10}$ has not changed its state, it is clear that the signal $F_{10}^{1-0}$ is not produced (since production of this signal requires flip-flop $F_{10}$ to change from its 1 state to its 0 state). Delay unit 43 therefore is not energized and its output signal J remains continuously at its high level throughout the shifting-in operation.

Signal K, on the other hand, the output signal produced by "or" gate 45, is not continuously at its high level throughout the shifting-in operation. It will be remembered that signal K is definable by the logical equation:

$$K = F^7 + F^6 + F^5 + F^4 + F^3 + F^2 + F^1$$

Signal K, therefore, will be at its low level only when all of the flip-flops $F_1$ through $F_7$ are in their 0 states. It is therefore clear that signal K, for the present example, will remain at its low level until the first digit of the steering signal is shifted into register 31 to set flip-flop $F_7$ to its 1 state. Signal K is thereupon raised to its high level and remains continuously at its high level throughout the remainder of the shift-in period, to be returned again to its low level only when the count-down of register 31 causes the count in the register to be reduced to zero. Inhibit signal I (defined previously by the signal function J.K) in the present example, follows the changes in signal K and therefore will not be returned to its low level (to suspend stepping operations of unit 32) until the count-down of register 31 causes the count contained therein to be reduced to zero.

Since the count of five is contained in register 31 at the completion of the shift-in period, it is clear that the application of five pulses along conductor $S^t$ will be required to count down register 31 to zero and thereby stop further stepping operations. It is not possible to display five pulses of the wave form $S^t$ on the same time scale as that used in Fig. 8. All of the operations performed during the shift-in period are completed in a very small fraction of the total computation interval, while the count-down period during which count pulses are applied by conductor $S^t$ to register 31, will ordinarily require much of the remaining time of the computation interval. Therefore, for the purpose of explaining the operation of coupler unit 20 during the count-down period, reference is made to Fig. 9 which displays the wave forms $S^t$, $F^1$ through $F^7$, and I, on a much contracted time scale, as they appear during the count-down period. It will be noted that operations during the count-down periods are synchronized and controlled by stepping pulses $S^t$ rather than by clock pulse signals $C_p$.

The wave forms at the beginning of the count-down period, of signals $F^1$ through $F^7$, correspond to those shown for the same time in Fig. 8 and indicate that a count of five is contained in register 31. During the count-down period, 5 pulses are applied to conductor $S^t$ to reduce the count in register 31 to zero, the five pulses being indicated in Fig. 9 by the negative excursions of wave form $S^t$. The first count-down pulse of signal $S^t$ changes the state of flip-flop $F_1$ from its 1 state to its 0 state, as shown by signal $F^1$, thereby reducing the count in the register to four (in binary notation 100). The second count-down pulse again changes the state of flip-flop $F_1$, setting it to its 1 state. However, the change of state of flip-flop $F_1$ from its 0 to its 1 state causes a carry pulse $F_1^{0-1}$ to be produced which changes the state of flip-flop $F_2$ to the 1 state. It is clear from the wave forms $F_1$ through $F_7$ shown in Fig. 8, that the application of the second count-down pulse with the corresponding production of a carry signal causes the count in register 31 to be reduced from a count of four to a count of three (in binary notation 011).

In a similar manner, the application of the 3rd, 4th and 5th count-down pulses reduces the count in register 31 successively to the counts, two, one, and finally zero. With reduction of the total count to zero, all of the wave forms $F^1$ through $F^7$ are at their low levels and therefore inhibit signal I drops to its low level to prevent further stepping operations by output unit 32 and thus to end the count-down period.

Thus there has been fully described the operation of coupler unit 20 for that mode of operation wherein a shifted-in number is fully counted down to zero simultaneously with a corresponding stepwise rotation of output shaft 23, full correction of heading error therefore being obtained during the count-down period. It will be remembered that other modes of operation are also possible for coupler unit 20.

In view of the foregoing detailed analysis of the operation of coupler unit 20, for the assumed example, possible variations in the operation for other modes of functioning will be apparent to those skilled in the art. For example, if it had been assumed that flip-flop $F_7$ registered overflow during the previous computation period, then flip-flop $F_{10}$ would have been in its 1 state at the beginning of the present computation period and transfer of the state of flip-flop $F_7$ to flip-flop $F_{10}$ (at the end of the shift-in period) would have changed the state of flip-flop $F_{10}$ from its 1 state to its 0 state, thereby producing an output signal $F_{10}^{1-0}$. In response to signal $F_{10}^{1-0}$, delay unit 43 would have been energized for five seconds thereby lowering inhibit signal I to its low level for five seconds to suppress further heading correction by output unit 32 while the aircraft rolls out of its banked turn.

In illustrating still another mode of operation, it may be assumed merely that the shifting-in of signal D' during the present computation period caused flip-flop $F_7$ to register overflow. Under such circumstances control signal $\overline{F^{10}}$ would have gone to its low level, at the end of the shift-in period, thereby causing output unit 32 to have a much higher rate of output rotation and production of stepping pulses during the succeeding count-down period.

Description of the operation and structure of coupler unit 20 is now completed except for detailed description, which is still required, for the structure of specific embodiments of shift gates 42, pulse generator 50 and stepping unit 52, which were briefly described hereinbefore in connection with Fig. 3. Referring now to Fig. 5 there is shown a preferred embodiment of a shift gate 42 adapted for transferring the state of any flip-flop $F_x$ to any other flip-flop $F_y$ (where $x$ and $y$ are any two integers). For example, it may be assumed that $x$ is equal to 7 and that $y$ is equal to 6. The shift gate 42 shown in Fig. 5 may then be considered to be representative of that gate 42 shown in Fig. 3, which interconnects flip-flops $F_7$ and $F_6$.

Figure 5:
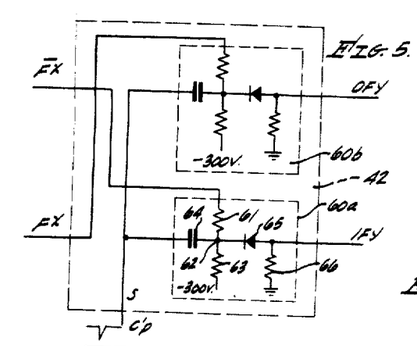
Fig. 5 is a circuit diagram illustrating the structure of a specific embodiment of an electronic shift gate which is shown in block form in the coupler unit of Fig. 3.

Shift gate 42, as illustrated in Fig. 5, receives complementary control signals $F^x$ and $\overline{F^x}$ from flip-flop $F_x$ and also receives clock pulse signals $C_p'$ which are applied to the S input of the shift gate. Output signals produced by the shift gate are applied to $1Fy$ and $0Fy$ input conductors of the above mentioned flip-flop $F_y$, the shift gate being adapted for passing negative pulse signals applied to its S input to the $1Fy$ input conductor when signal $F^x$ is at its high level, and for passing the pulse signals to the $0Fy$ input conductor when signal $\overline{F^x}$ is at its high level. It will be remembered that the signals $F^x$ and $\overline{F^x}$ always bear a complementary relationship to each other so that when either of them is at a high level, the other complementary signal is at its low level.

As shown in Fig. 5, shift gate 42 is seen to comprise two identical pulse gates 60a and 60b. Referring to gate 60a, by way of example, it is seen that conductor $\overline{F^x}$ is connected through a resistor 61 to a terminal 62, the terminal 62 being connected through a resistor 63 to a source of negative potential and being also connected through a condenser 64 to input conductor $C_p'$. Terminal 62 is also connected to the cathode of a rectifier 65, the anode of rectifier 65 being connected to output conductor 1Fy. A resistor 66 is interconnected between conductor 1Fy and ground. Pulse gate 60b is entirely identical in structure, it being controlled, however, by signal $F^x$ and its output being applied to conductor 0Fy.

In operation (referring to gate 60a by way of example) when signal $\overline{F^x}$ is at its high level, there is a positive voltage potential at terminal 62, diode 65 therefore being back-biased so that it is non-conductive. Application of a negative signal through condenser 64 is not sufficient to lower the voltage at terminal 62 to a negative value, diode 65 therefore remaining non-conductive and blocking the passage of a negative pulse from input conductor $C_p'$ to output conductor 1Fy. However, when signal $\overline{F^x}$ is at its low level, the voltage at terminal 62 is only slightly positive and is very close to ground potential, the application of a negative clock pulse through condenser 64 being sufficient under these circumstances to lower the voltage at terminal 62 to a negative potential, thereby causing recifier 65 to conduct strongly and pass the applied clock pulse to output conductor 1Fy.

To summarize: in operation pulse gate 60a blocks passage of an applied negative pulse from its S input to output conductor 1Fy whenever control signal $\overline{F^x}$ is at its high level and passes the applied pulse whenever control signal $\overline{F^x}$ is at its low level. Gate 60b is similarly operative for passing applied input pulses to conductor 0Fy in accordance with the voltage level of control signal $F^x$.

Figure 6:
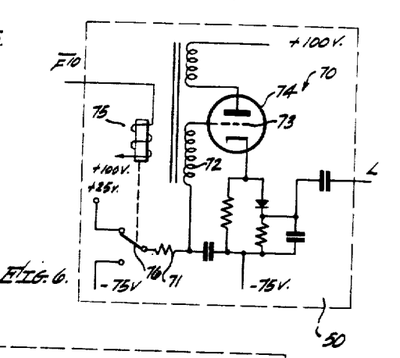
Fig. 6 is a circuit diagram of a pulse generator having a variable rate of signal production, and may be considered to be a specific embodiment of a pulse generator shown in block form in Fig. 3.

Referring now to Fig. 6, there is illustrated a preferred embodiment of pulse generator 50, which is seen to comprise a largely conventional free-running, blocking oscillator generally designated 70, for repetitively applying positive pulses to output conductor L. The pulse repetition rate attained by blocking oscillator 70 is related to the value of a bias voltage which may be supplied through a switch arm 76, a resister 71, and an inductive winding 72 to a control grid 73 of a triode 74, which is utilized in the blocking oscillator. As shown in Fig. 6, a relay circuit generally designated 75, receives rate control signal $\overline{F^{10}}$ and is adapted for selectively connecting switch arm 76 to two separate sources of −75 volts or +25 volts respectively when signal $\overline{F^{10}}$ is at its corresponding high and low levels. When the bias voltage supplied is −75 volts, pulse generator 50 will require a relatively long time after the production of an output pulse to recharge its grid circuit to a firing or triggering potential and will therefore have a relatively low pulse repetition frequency. However, when the bias voltage supplied is +25 volts, pulse generator 50 will relatively quickly recharge its grid circuit after each output pulse and will therefore have a relatively high pulse repetition rate. Thus, it is clear that the pulse repetition frequency of signal L is controlled in accordance with the voltage level of rate control signal $\overline{F^{10}}$ which, as shown hereinbefore, selectively controls the bias voltage applied to the grid circuit of pulse generator 50.

Referring now to Fig. 7 there is shown a specific embodiment of stepping unit 52 which is seen to comprise an inverting amplifier 112, a stepping motor drive circuit 113, a stepping motor 114, and a reversing relay generally designated 115. Inverting amplifier $S^t$ is adapted for receiving negative pulses applied over input conductor $S^t$ and inverting these pulses to apply corresponding positive pulses over a conductor $E_2$ to drive circuit 113. Drive and clamp circuit 113 is of the type described in detail in copending U.S. patent application Serial No. 320,311 and now U.S. Patent No. 2,717,310 for Direct Current Electronic Integrating System by Thomas Ellis Woodruff, filed November 13, 1952. As shown in Fig. 7 drive circuit 113 is connected to stator windings 321, 325, and 317 of stepping motor 114, said drive circuit being adapted, as described in more detail in the aforementioned copending application to Woodruff, for responding to each positive pulse of signal $E^2$ by sequentially energizing the stator windings 321, 325, and 317; thereby causing a rotor 126 of stepping motor 114 to rotate through a single clockwise step. Output shaft 54 is coupled to rotor 126 and is rotatable in accordance with rotation of rotor 126 of the stepping motor. Stepping motor 114 is of the type generally described in the hereinbefore mentioned application to Woodruff and more particularly described and claimed in U.S. Patent No. 2,627,040 for "Stepping Motor" by S. Hansen.

Relay 115 is controlled by signal $F^s$, and is energizable by signal $F^s$ at its low level for reversing the connections between drive circuit 113 and stator windings 321 and 325 respectively, of stepping motor 114. When these connections are reversed the sequence of energization of the stator windings is reversed, so that normal operation of circuit 113 causes counter-clockwise rather than a clockwise rotation of output shaft 54. Thus it is clear that the sense of rotation of shaft 54 is controlled by signal $F^s$ while the rate of stepwise rotation of shaft 54 is determined by the rate at which stepping pulses are applied to input conductor $S^t$.

What is claimed as new is:

1. An apparatus for adjusting a selected condition of a physical system in accordance with the values of other conditions thereof, the conditions of the physical system being respectively represented by corresponding condition signals, said apparatus comprising: a digital control unit coupled to the physical system for receiving the condition signals and for periodically producing digital control signals, each being representative of a correction for the selected condition during consecutive intervals of time; a digital-to-analog coupler unit coupled to said digital control unit and responsive to the digital control signals for producing an analog control signal representative of the correction for the selected condition; a closed analog servo loop coupled to the physical system and responsive to the selected condition to control the selected condition of the system, and means connecting said analog servo loop to said coupler unit to be responsive to said analog control signal for changing the selected condition in accordance with the analog control signal, thereby to vary the selected condition of the system in accordance with the values of the other conditions.

2. The combination defined in claim 1 wherein said digital control unit includes apparatus for receiving that condition signal which is representative of the value of the selected condition and for periodically forming digital control signals in accordance with the difference between the value of the selected condition and the desired value of the selected condition, the digital control signal being representative of the magnitude of said difference.

3. The combination defined in claim 1 wherein said analog servo loop includes a sensing unit coupled to the physical system for producing an analog condition signal which is representative of the true value of the selected condition, an analog combining unit coupled to said sensing unit and to said coupler unit for combining the analog control signal with the analog condition signal to form a resultant analog output signal, and an analog controller intercoupled between said combining unit and the physical system and responsive to said resultant signal for changing the selected condition of the physical system to maintain the resultant signal at a predetermined value.

4. In a partly digital servo loop for maintaining a first numerically measurable condition of a physical system at a desired value in accordance with the numerical values of other conditions of the physical system, the desired value for the first condition being calculable as a function of the other conditions, the combination comprising a digital control unit in said partly digital servo loop for periodically sampling condition signals representative of conditions of the physical system to periodically produce correspondingly resultant digital control signals in accordance with the corresponding desired values of the first condition, each digital control signal being representative of the difference between the sampled value of the first condition and the corresponding desired value of the first condition, an analog servo loop, said analog servo loop including the physical system, a sensing unit forming part of said analog servo loop coupled to the physical system for producing an analog condition signal which is representative of the value of the first condition, a digital-to-analog coupler unit coupled to said digital control unit and responsive to said digital control signals for producing an analog control signal, an analog combining unit coupled to said sensing unit in said analog servo loop and to said coupler unit to be responsive to said analog condition signal and to said analog control signal for combining the analog control signal with the analog condition signal to form a resultant analog output signal, and an analog controller in said analog servo loop, responsive to said resultant signal and coupled to the physical system for changing the first condition of the physical system to maintain said resultant signal at a predetermined value.

5. The combination defined by claim 4 wherein said analog combining unit is a synchro unit having a stator winding and a rotor winding, one winding being connected to said sensing unit and the other winding being connected to said analog control unit, and said digital-to-analog coupler unit includes a stepping motor mechanically connected to rotate said rotor winding of said analog combining unit, said stepping motor being responsive to each digital control signal for rotating said rotor winding through a discrete angle.

6. The combination defined by claim 5 wherein said digital-to-analog coupler unit includes an electronic storage register having an input conductor $S^t$ and a plurality of two-state flip-flop circuits for representing a number by the states of said flip-flops, said register including apparatus responsive to the application of a stepping pulse to conductor $S^t$ for reducing the number contained therein by a predetermined count, said register having means for producing a plurality of output signals representative of the number contained in said register, an output unit including said stepping motor and responsive to said output signals of said register for controlling said stepping motor through successive discrete rotational positions; said output unit including apparatus for simultaneously producing a stepping pulse and for applying the stepping pulse to conductor $S^t$ for each stepwise rotation of said stepping motor, said output unit having an input conductor I and being responsive to the application of an inhibit signal to conductor I for suspending the normal stepping operation of the output unit; and a signal control circuit coupled to said digital control unit and to said register and said output unit for initially setting said flip-flops to states representative of the difference represented by the digital control signal and for receiving said plurality of output signals to produce the inhibit signal and to apply the inhibit signal to conductor I whenever the number represented is equal to zero; whereby further rotation of said stepping motor is suspended whenever the rotational position of said stepping motor is representative of a desired value for the first condition.

7. The combination defined by claim 6 wherein said register produces an output signal $F^s$ representative of the sign of the number stored therein, and said output unit is connected to said register for receiving the output signal $F^s$, said output unit being responsive to the signal $F^s$ for rotating said stepping motor in clockwise or counter-clockwise direction in accordance with the sign represented by the signal $F^s$.

8. In a digital servo apparatus for automatically directing an aircraft to a predetermined destination, by continually adjusting the heading of the aircraft to maintain a desired heading for the aircraft satisfying a predetermined relationship between the heading of the aircraft and the altitude, airspeed, and position coordinates of the aircraft, the heading, altitude, airspeed and position coordinates of the aircraft being respectively represented by corresponding condition signals, the combination comprising: a digital control unit coupled to the aircraft for receiving the condition signals and for periodically producing digital control signals in accordance with the value of the heading of the aircraft and the corresponding value of a desired heading for the aircraft, each digital control signal being representative of the difference between the value of the heading and the value of the corresponding desired heading; a digital-to-analog coupler unit coupled to said digital control unit and responsive to the digital control signals for producing an analog control signal; and a closed analog autopilot servo loop coupled to the aircraft and responsive to the condition signal corresponding to heading of the aircraft, and means connecting said autopilot servo loop to said coupler unit to respond to the analog control signal for changing the heading in accordance with the digital control signal.

9. The combination defined by claim 8 wherein said coupler unit includes an output shaft and apparatus for positioning said output shaft at rotational positions sequentially representative of the time integral of said difference, the angular position of said shaft with respect to a reference position being said analog control signal.

10. The combination defined by claim 9 wherein said analog autopilot servo loop comprises a compass coupled to the aircraft for generating a heading condition signal representative of the heading of the aircraft relative to the magnetic north-south direction; a differential synchro generator energized by said compass and having a rotor coupled to said output shaft of said coupler unit to be positioned thereby to produce a modified heading signal, and an autopilot controller intercoupled between said synchro generator and the aircraft, said autopilot controller being responsive to said modified heading signal for acting upon the aircraft to change the heading of the aircraft so as to maintain said modified synchro signals at values representative of a desired heading for the aircraft, said controller thereby tending to maintain the heading of the aircraft at values corresponding to the heading represented by the rotational position of said output shaft.

11. In a control system for controlling a given condition of a physical system in dependence upon other conditions of said physical system, the combination of, analog sensing means coupled to said physical system and responsive to said given condition for producing an electrical analog control signal, an analog servo system coupled to said physical system and controlling said given condition of said physical system, an analog signal combining unit coupled to said analog sensing means and responsive to said analog control signal and coupled to and controlling said analog servo system, digital computer means coupled to said physical system and responsive to said given condition and at least one of said other conditions for computing and producing a correction signal, and digital-to-analog coupling means coupled between said digital computer and said analog signal combining unit, said digital-to-analog coupling means being controlled by said correction signal and producing an analog correction signal applied to said analog signal combining unit.

12. In a system for controlling a given condition of a physical system in dependence upon other conditions of said physical system, the combination of, an analog servo control loop coupled to said physical system and responsive to said given condition and having output means coupled to said physical system for controlling said given condition, said analog servo control loop including an analog signal combining unit; a digital computer having input connections to said physical system and being responsive to said given condition and at least one of said other conditions of said physical system for computing a digital correction signal, and digital-to-analog coupling means coupled between said digital computer and said analog signal combining unit signal in response to said digital correction signal, whereby said analog correction signal is and producing an analog correction signal applied to said analog signal combining unit.

13. An aircraft flight control system comprising: a compass physically disposed on said aircraft for producing electrical heading signals; an autopilot disposed on said aircraft and including output servos connected to and controlling said aircraft; a signal combining unit having an input connection with said compass and receiving said electrical heading signals and having an output connected to and controlling said autopilot; radio location apparatus on said aircraft, a digital computer coupled to and controlled by said compass and said radio location apparatus for computing a correction signal, and digital-to-analog coupling means coupled to said digital computer and controlled by said correction signal and connected to and controlling said signal combining unit.

14. An aircraft flight control system for controlling an aircraft having a compass producing electrical heading signals and having radio location apparatus, comprising: autopilot means having output means for controlling said aircraft, a differential synchro having a three winding stator member and a three winding rotor member, circuit means connecting one of said members to said compass to be energized by said electrical heading signals of said compass, circuit means connecting said other member to said autopilot to control said autopilot, a digital computer having input connections connected to said compass and to said radio location apparatus to be energized by said compass and by said radio location apparatus, for computing a quantized electrical heading correction signal; and digital-to-analog coupling means connected to said digital computer and responsive to said quantized correction signal and including a stepping motor connected to and driving said rotor member.

15. An aircraft flight control system for an aircraft having a compass producing electrical compass heading signals and having radio location apparatus, comprising: an autopilot having output means for controlling said aircraft, a digital computer coupled to said radio location apparatus and responsive to said radio location apparatus, for producing quantized heading correction signals; digital-to-analog converter means coupled to said digital computer and responsive to said quantized heading correction signals for producing a plural input analog heading correction signal, and an analog signal combining unit connected inputwise to said compass and said digital-to-analog converter means to receive and to combine said compass heading signals and said analog heading correction signals and having an output connected to and controlling said autopilot.

16. In an aircraft flight control system having an autopilot disposed to fly said aircraft and having a digital computer arranged to compute and produce quantized flight correction signals, a coupler connecting said digital computer to said autopilot to apply the analog equivalents of said quantized correction signals to said autopilot to control said autopilot, comprising: a shifting-counting register having a shift input circuit disposed to receive said quantized correction signals, having a count down input circuit and having an output circuit; a controllable pulse-rate, pulse generator; circuit means operable in dependence of the magnitude of said quantized correction signal and connected to control the pulse-rate of said pulse generator, gating circuit means connected with the output of said pulse generator and with said output circuit of said shifting-counting register to be controlled thereby, pulse responsive analog signal producing means disposed to control said autopilot, and circuit means connecting the output of said gating circuit means to said pulse responsive analog signal producing means and to said count down input circuit of said shifting-counting register.

17. The combination defined in claim 16 wherein said circuit means controlling the pulse-rate of said pulse generator comprises, an overflow stage in said shifting-counting register receiving the quantized correction signal overflow and a response circuit including a shift gate connected to and controlled by said overflow stage and having an output circuit arrangement connected to and controlling the pulse-rate of said pulse generator.

18. A condition responsive control system responsive to at least two physical conditions of a physical system for controlling one of said two conditions, comprising: an analog control system having input means responsive to one of said two conditions and having output means for controlling said one condition; analog signal combining means forming part of said analog control system; a digital control system having input means responsive to both of said conditions and having digital output means; and a digital-to-analog converter having an input coupled to said digital output means and having an output coupled to said analog signal combining means.

References Cited in the file of this patent

UNITED STATES PATENTS

| | | |
|---|---|---|
| 2,537,427 | Seid et al. | Jan. 9, 1951 |
| 2,592,173 | Noxon et al. | Apr. 8, 1952 |
| 2,682,369 | Doersam | June 29, 1954 |
| 2,715,678 | Barney | Aug. 16, 1955 |

OTHER REFERENCES

"Digital-Analogue Conversions," by W. R. Blunden, published April 1952 in "Proceedings of Conference on Automatic Computing Ma.," held in Dept. of E. E., University of of Sydney, August 1951, pages 185–195.

"Multichannel Analog Input-Output Conversion System for Digital Computer," by M. L. MacKnight and P. A. Adamson, published April 1953 in part 7 of Convention Record of the March 23–26 IRE National Convention, pages 1–6.

UNITED STATES PATENT OFFICE
CERTIFICATE OF CORRECTION

Patent No. 2,932,471　　　　　　　　　　　　　　　　April 12, 1960

William L. Exner et al.

It is hereby certified that error appears in the printed specification of the above numbered patent requiring correction and that the said Letters Patent should read as corrected below.

Column 9, line 54, for "30" read -- 20 --; column 12, line 63, for "including" read -- indicating --; column 25, line 14, beginning with "signal in response to said" strike out all to and including "combining unit." in line 17, same column, and insert instead -- and producing an analog correction signal in response to said digital correction signal, whereby said analog correction signal is applied to said analog signal combining unit. --; line 59, beginning with "a plural input analog" strike out all to and including "said autopilot." in column 26, line 2, and insert instead -- an analog heading correction signal, and a plural input analog signal combining unit connected inputwise to said compass and said digital-to-analog converter means to receive and to combine said compass heading signals and said analog heading correction signals and having an output connected to and controlling said autopilot.--.

Signed and sealed this 6th day of December 1960.

(SEAL)
Attest:
KARL H. AXLINE
Attesting Officer

ROBERT C. WATSON
Commissioner of Patents